United States Patent [19]
Passehl

[11] Patent Number: 5,971,487
[45] Date of Patent: Oct. 26, 1999

[54] AUTOMOBILE SEAT DIVIDER FOR CHILDREN

[75] Inventor: Robert P. Passehl, 371 Lawrence Rd., Huntingdon Valley, Pa. 19006

[73] Assignee: Robert P. Passehl, Huntingdon Valley, Pa.

[21] Appl. No.: 09/069,541

[22] Filed: Apr. 30, 1998

Related U.S. Application Data

[60] Provisional application No. 60/048,004, May 30, 1997.

[51] Int. Cl.$^6$ .................................................. A47C 31/00
[52] U.S. Cl. .................. 297/464; 297/217.1; 297/463.2; 297/411.24; 297/228.1; 297/228.13; 297/188.01; 108/44; 108/60; 5/513; 296/24.1; 296/37.8; 296/DIG. 1
[58] Field of Search ................................ 297/464, 217.1, 297/232, 463.2, 411.24, 188.01, 188.04, 188.06, 228.1, 228.13; 108/44, 60; 5/513; 296/24.1, DIG. 1, 37.8

[56] References Cited

U.S. PATENT DOCUMENTS

| | | |
|---|---|---|
| 1,239,166 | 9/1917 | Dean . |
| 2,006,883 | 7/1935 | Davies et al. . |
| 3,117,534 | 1/1964 | Martland .................................... 108/60 |
| 3,479,085 | 11/1969 | Weinstein ............................. 297/228.1 |
| 4,047,756 | 9/1977 | Ney ................................ 297/228.13 X |
| 4,118,812 | 10/1978 | Pangburn ................................. 5/513 X |
| 4,938,401 | 7/1990 | Weisbrodt et al. .................... 108/44 X |
| 5,123,707 | 6/1992 | Wurzell .................................... 297/464 |
| 5,255,958 | 10/1993 | Frischmann ............................. 297/464 |
| 5,518,293 | 5/1996 | Coy et al. ........................ 297/250.1 X |
| 5,560,058 | 10/1996 | Smith .......................................... 5/513 |
| 5,560,680 | 10/1996 | Salvador et al. ................... 297/256.15 |

*Primary Examiner*—Peter M. Cuomo
*Assistant Examiner*—Rodney B. White
*Attorney, Agent, or Firm*—Gregory J. Gore

[57] ABSTRACT

A substantially rectangular, vertically-extending divider made of soft compressible material and having a height approximately equal to the height of the rear backrest of a motor vehicle attaches to the rear seat by employing the rear seat center seat belt. A slot at the back of the seat divider receives the center seat belt such that when secured by the seat belt, the soft material of the divider is compressed against the rear seat providing secure retention. The dimension of the seat divider extends forwardly through the interior cabin space between the backrests of individual front seats of the vehicle, and the width of the divider is substantially equal to the space between the front seat backrests. The divider includes a notch at the front bottom corner which receives and rests upon a center console of the vehicle. An internal rigid planar foam core, which extends substantially across the entire side profile of the divider, provides structural integrity to the divider. The divider further includes a cover that may include pockets of various sizes and shapes along its exterior surface.

12 Claims, 2 Drawing Sheets

AUTOMOBILE SEAT DIVIDER FOR CHILDREN

Priority based upon Provisional Patent Application Serial No. 60/048,004, filed on May 30, 1997 entitled "Automobile Seat Divider for Children", is hereby claimed.

FIELD OF THE INVENTION

The present invention relates generally to vehicular use, as a seat divider, with slip covers that fit similar to a pillow case, in a variety of colors, materials, some with and without pouches, etc. to serve as storage for toys, activities, etc.

BACKGROUND OF THE INVENTION

The concept of attaching supportive and retaining devices for children in the back seat of automobiles is not new. For example, the following U.S. patents show some devices for this purpose, but none have the slip covers, none extend to the front seat, and none are raised high enough that the children cannot see each other and still not be in the way of the driver's vision of what is behind them on the road. They include: U.S. Pat. Nos. 1,239,166; 2,006,883; 4,118,812; 4,938,401; 5,123,707; 5,255,958; 5,518,293; and 5,560,680.

Wurzell, U.S. Pat. No. 5,123,707, provides a seat divider for the rear seat, but does not address the problem of children bickering in the rear seat. Wurzell's divider does not extend to a height above a child's eye level and does not extend through an automobile's front seats to prevent the children from seeing and touching each other. The divider of Wurzell is also not very sturdy because it is only supported by inserting the back of the divider into the crevice between the back and bottom of the rear seat, rather than supported by the front seat and seat belt of the rear seat of the automobile.

In Pangburn, U.S. Pat. No. 4,118,812, a divider is supported by a rear seat belt. Pangburn provides slots to allow a seat belt to attach the divider to the rear seat, but there is no additional support from the front seats. In addition, the divider of Pangburn does not extend above a child's eye level and does not provide a comfortable cushion for a child to rest his head.

None of the above-described prior art patents include means for easily converting a seat divider by applying different covers. Another need in the art is for a seat divider which may be securely installed without any additional structures, other than those already provided in the vehicle. There is therefore a need in the art for a full-coverage divider which indeed divides the children in the back of the rear seat of an automobile and which is high enough to fully block the children's view of each other; lightweight and portable; easily attached and removed; economic to manufacture; and securely affixed when in place.

SUMMARY OF THE INVENTION

The present divider is designed for children of all ages when traveling in the car for short or long trips. The construction is such that the children cannot see each other, and therefore a lot of arguing and/or fighting can be avoided. Dividers of different dimensions are made to fit different vehicles. By using the special slip covers designed for this divider, the children in the back can store their toys, books, etc. in the covers that come with pouches or pockets so there is no mess all over the back seat or the floor of the automobile. Also, because of the comfort of the foam over the Styrofoam® core, the children can rest their head, making it comfortable for a nap.

This divider is made of soft foam with a rigid Styrofoam® central core which makes it light to carry to remove and store in the trunk of the car or in the house. The divider extends into the front seat area in cars that have a console and is also made to fit cars without consoles. The rear center seat belt slides through a slot made on the divider to secure it in the center, so children cannot push it over. The rigid core provides a sturdy attachment of the divider when compressed against the seat cushion by cinching the seat belt. Replaceable slip covers fit like a pillow case, and covers of different ornamental design may also be sold as a novelty item. They preferably are made in a variety of colors and styles for boys and girls. Some may have pouches or pockets and some will not. Considering the amount of traffic accidents and family feuding in the car on a routine drive because of bickering children, the need for a device of this nature made of these materials is of great value.

More specifically, the applicant has invented a divider for children in a vehicle having front seats with individual backrests and a bench-type rear seat having a center seat belt and a rear seat backrest, comprising: a substantially rectangular, vertically-extending, divider cushion made of soft, compressible material having a height approximately equal to the height of the rear seat backrest; a securement slot at the back of the seat divider cushion for receiving the center rear seat belt, such that when secured by the seat belt, the soft material of the seat divider is compressed against the rear seat, providing secure retention; and wherein the seat divider extends forwardly through the interior cabin space between the backrests of the front seats of the vehicle. The divider includes a notch at the front bottom corner which receives and rests upon a center console of the vehicle. The width of the divider is equal to a space between the front seat backrests. The seat divider includes a rigid planar foam core which extends substantially across the entire side profile of the divider. A cover surrounds the seat divider which can include side pockets and front pockets of various sizes and shapes. The cover may be secured around the seat divider by various attachment means, such as a zipper or buttons. The cover may be made of various materials, such as plastic or cloth.

A final consideration is that none of the other disclosed seat devices are as simple as the present divider. This lightweight device will become an asset to anyone wanting a peaceful drive in the car with the children. Other related objects and advantages of the present invention will be apparent from the following illustrations.

DESCRIPTION OF THE PREFERRED EMBODIMENT

Figure 1:
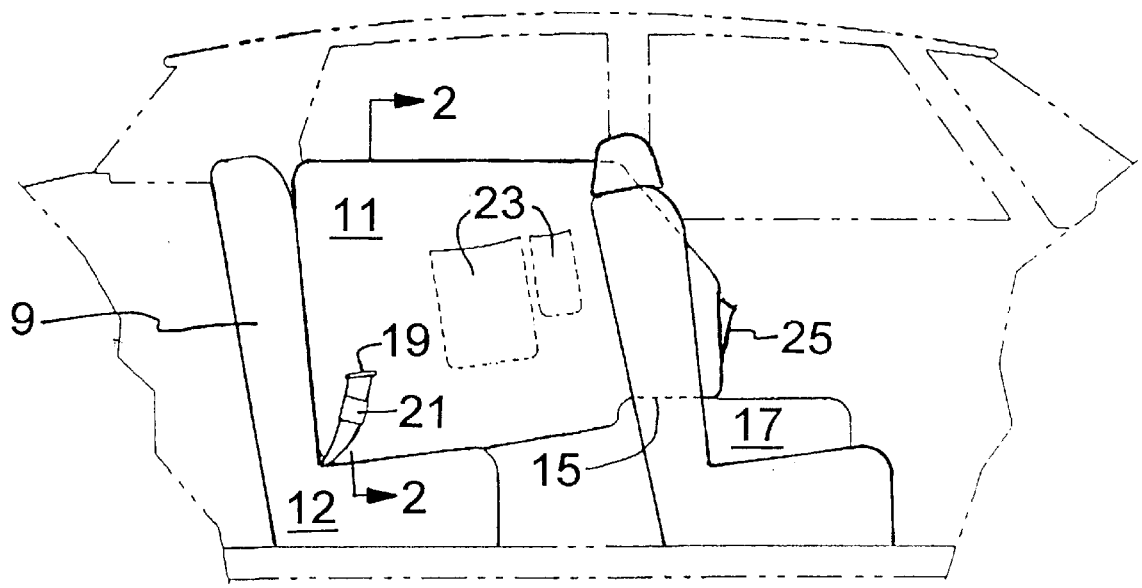
FIG. 1 is a side view of the present invention installed in a motor vehicle, the external body of which is depicted in phantom lines.

FIG. 1 shows the general lateral profile of the child divider 11 of the present invention. Its greatest height is along its rear edge which is forced against the backrest 9 of the automobile rear seat 13 by the tension of a seat belt. The profile tapers downward to the front with a notch 15 at the lower right-hand corner to accept console 17, usually found between the front seats. A small slot 19 toward the rear, positioned almost midway toward the top of the divider, provides a slot for means of attachment by the rear seat center seat belt 21. The divider extends forward between the front seats and the width of the divider is approximately equal to the space between the front seat backrests so that they support the front of the divider laterally. As discussed further below, pockets 23 and 25 are part of the fabric cover of the divider. The height of the divider is no greater than the rear deck behind the rear seats and therefore the rear view, directly or through a rearview mirror, remains totally unobstructed when the divider is in place. The height of the divider however is sufficient so that it is above the eye level of child occupants in the back seat. Seat belt 21 is shown passing through the attachment slot at an angle which applies a downward and rearward force to the divider. This ensures a snug fit against the rear seat and backrest cushions.

Figure 2:
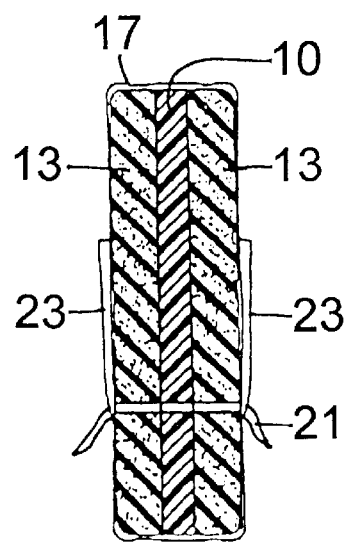
FIG. 2 is a rear sectional view of the present invention taken from FIG. 1 as shown in that figure.

FIG. 2 is a cross-section of FIG. 1 showing the particular construction of the present invention. A central core 10 preferably of rigid Styrofoam®, is surrounded by cushion pieces 13 on either side which may be made from soft foam material. The laminated substructure is covered by a cloth slipcover 17 which may, for example, include pockets on either side 23 for convenient storage of play articles. The seat belt attachment slot passes through core 10 and the tension of seat belt 21 is thus firmly transmitted to the abutting rear seat backrests and cushion to ensure secure attachment.

Figure 3:
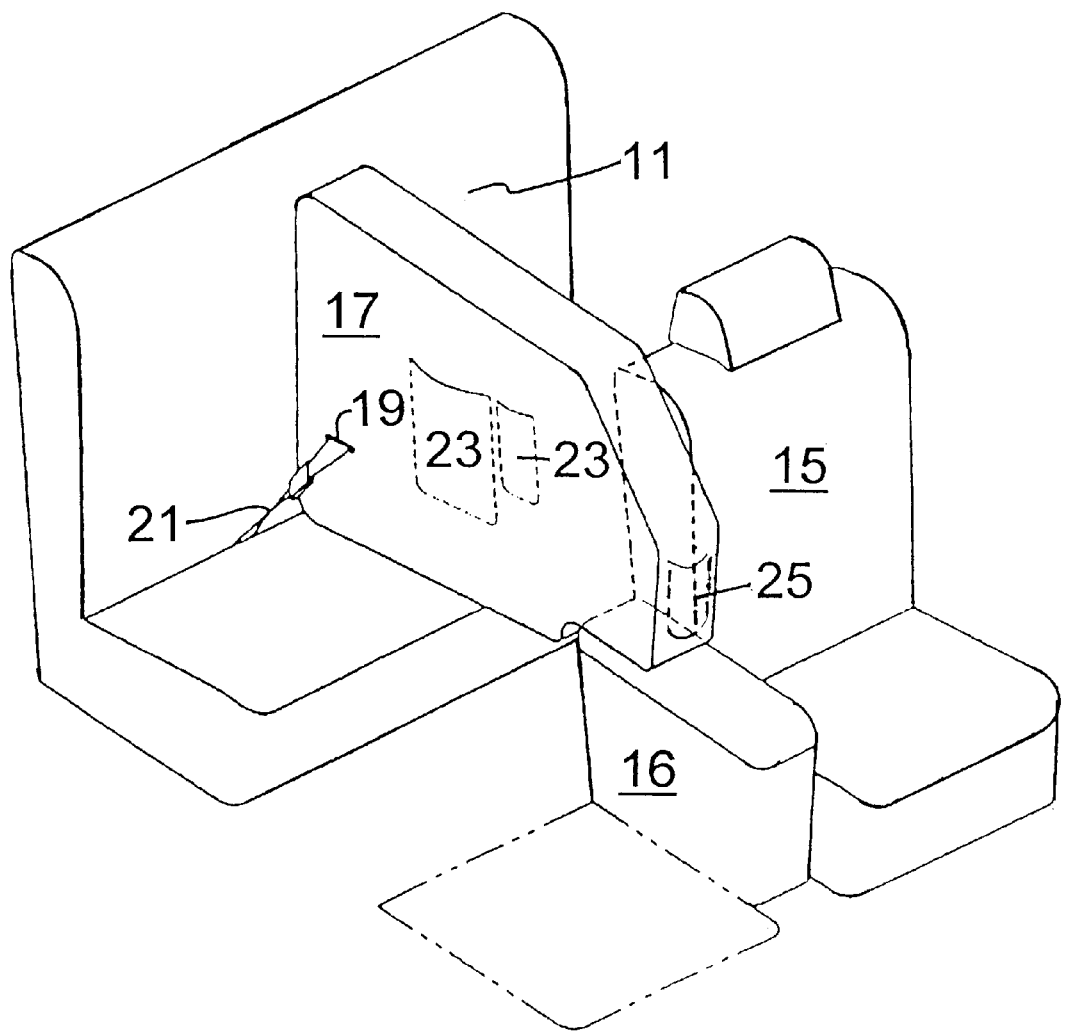
FIG. 3 is a top left front isometric view of the present invention installed in a motor vehicle.

FIG. 3 shows greater detail of the present invention extending forward against seat backrest 15 and resting on console 16. When positioned between two front seats as shown in FIG. 1, lateral support for the divider 11 prevents it from being pushed over side-to-side by either of the children. The rigid central Styrofoam® core provides added lateral stability so that support by the sides of the two front seats is transmitted the length of the divider 11. This drawing further illustrates that the height of the divider is above the line of sight of the children occupying the rear seat and that the divider 11 is positively held in place by passage of the center seat belt 21 through the attachment slot 19.

Divider 11 includes a cover 17 that has several pockets, or pouches, 23 and 25. The side of divider 11 has two large pockets a to hold larger items, such as books or tapes, and two small pockets to hold smaller items, such as pens or small toys. The opposite side of divider 11 may also have pockets for the other child. As a result, each child may keep his or her own things in his or her own pockets and access them during each car trip. The front of the divider has a pocket 25 to hold items that are accessible to the front passengers. Storing various items in the pockets will keep the inside of the car looking uncluttered.

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents.

What is claimed is:

1. A child seat divider in combination with a vehicle having an interior cabin space, including front seats with individual backrests and a bench-type rear seat having a center seat belt and a rear seat backrest, comprising:

a substantially rectangular planar, vertically-extending, divider having a height approximately equal to the height of said rear seat backrest;

a securement slot at a back of said seat divider receiving said center rear seat belt, such that when secured by said seat belt, the seat divider is compressed against the rear seat, providing secure retention; and wherein said seat divider extends forwardly through the interior cabin space between the backrests of the front seats of said vehicle.

2. The seat divider of claim 1, wherein the width of the divider is equal to a space between the front seat backrests.

3. The seat divider of claim 2, further including a central rigid planar core which extends substantially across an entire side profile of the divider, covered on each side by cushions.

4. The seat divider of claim 3, wherein said cover includes side pockets of various sizes and shapes.

5. The seat divider of claim 3, wherein said cover includes a front pocket on a front surface of said seat divider that extends through the interior cabin space, said surface being situated between said front seats of said vehicle.

6. The seat divider of claim 3, wherein said cover is secured around said seat divider with a zipper attached to said cover.

7. The seat divider of claim 3, wherein said cover is secured around said seat divider with buttons attached to said cover.

8. The seat divider of claim 3, wherein said cover is made of a plastic material.

9. The seat divider of claim 3, wherein said cover is made of a cloth material.

10. The seat divider of claim 3, further including cushions on opposite lateral sides of the rigid core.

11. The seat divider of claim 1, further including a cover, wherein said cover surrounds said seat divider.

12. The seat divider of claim 2, further including a notch located at a front bottom corner of said seat divider for receiving a front seat center console upon which it rests.

\* \* \* \* \*